Patented May 20, 1947

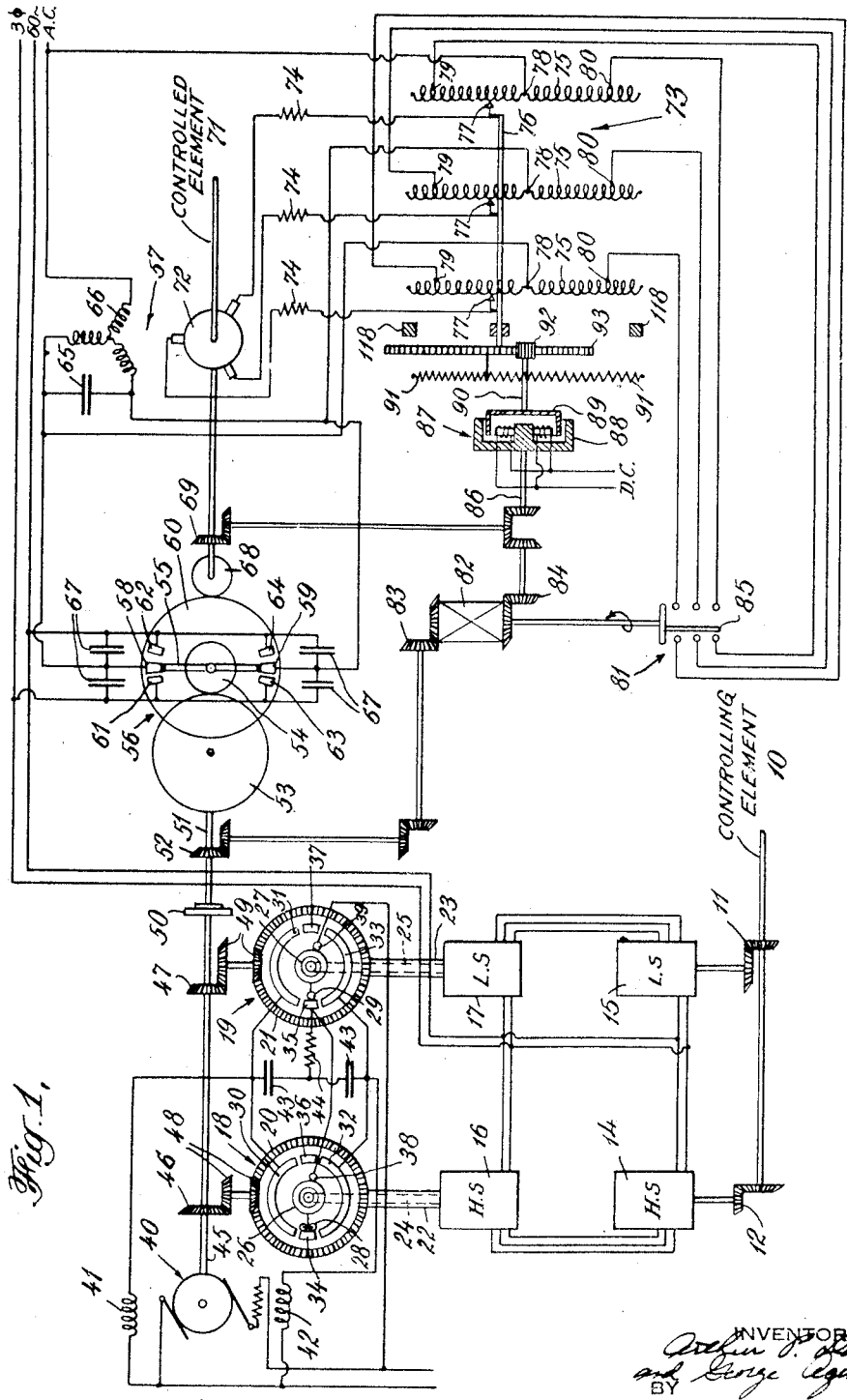

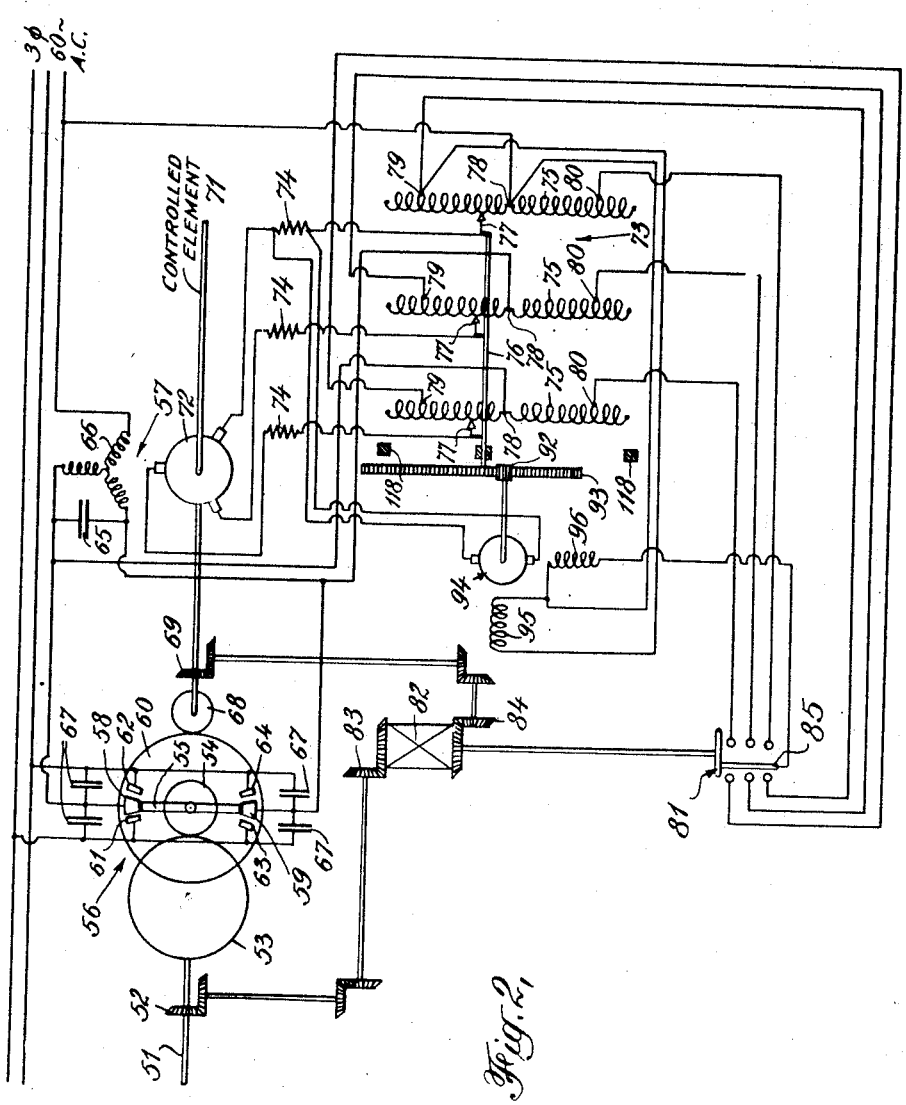

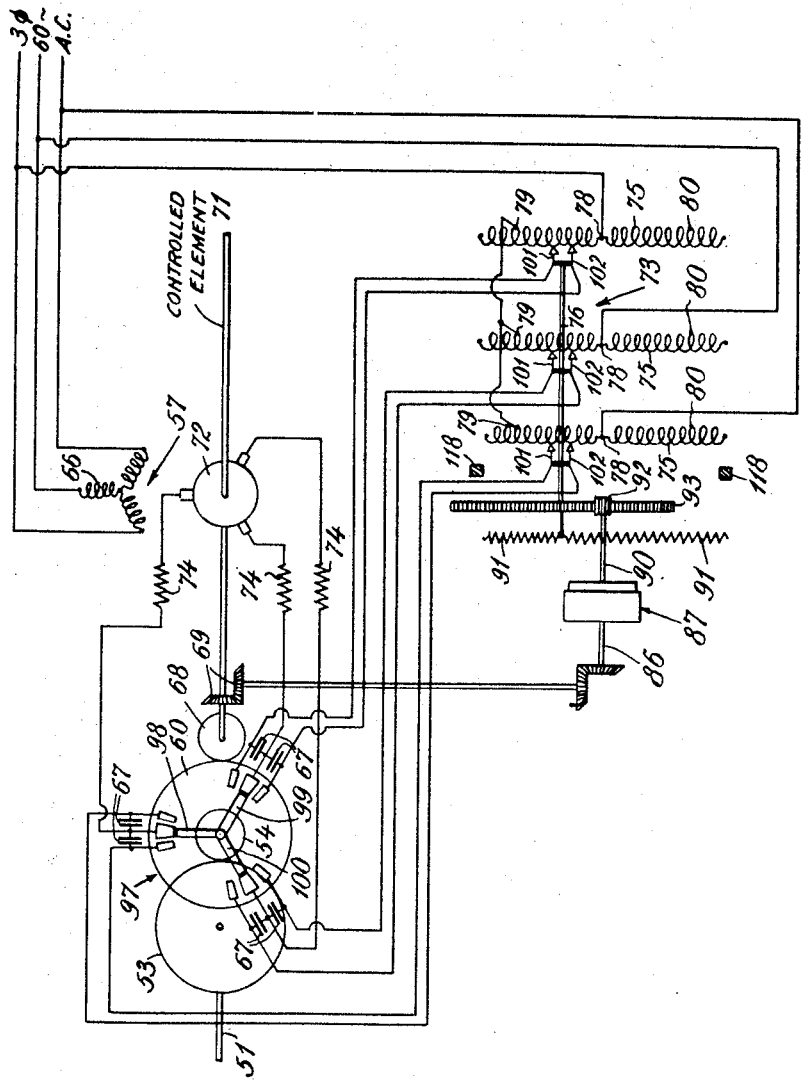

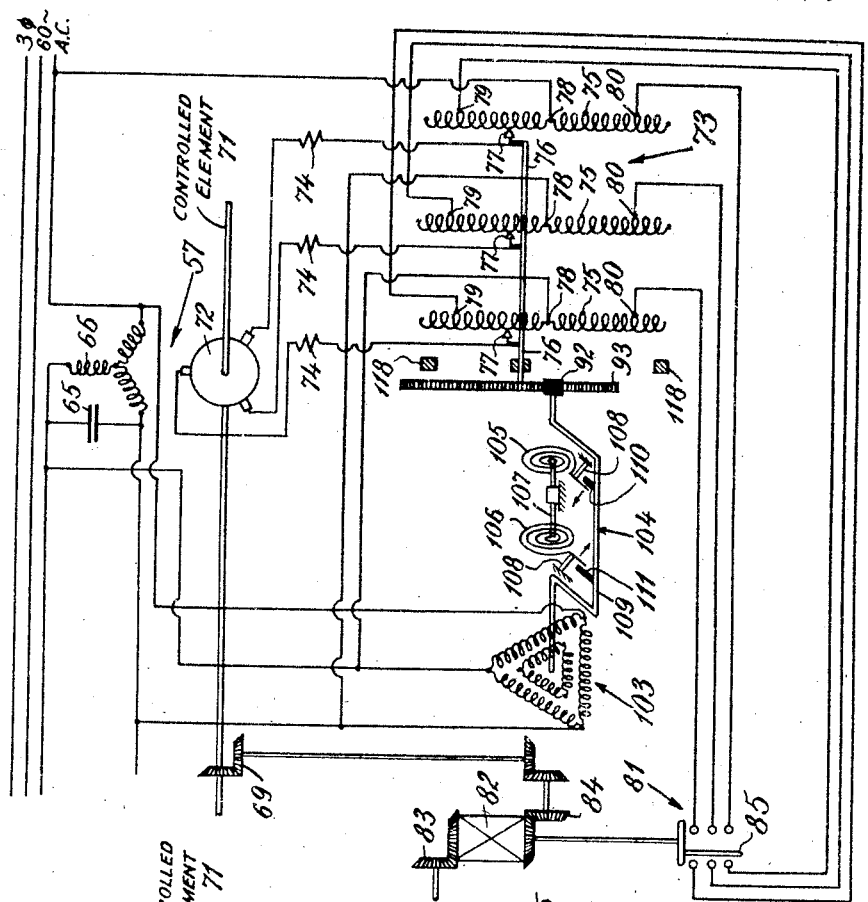
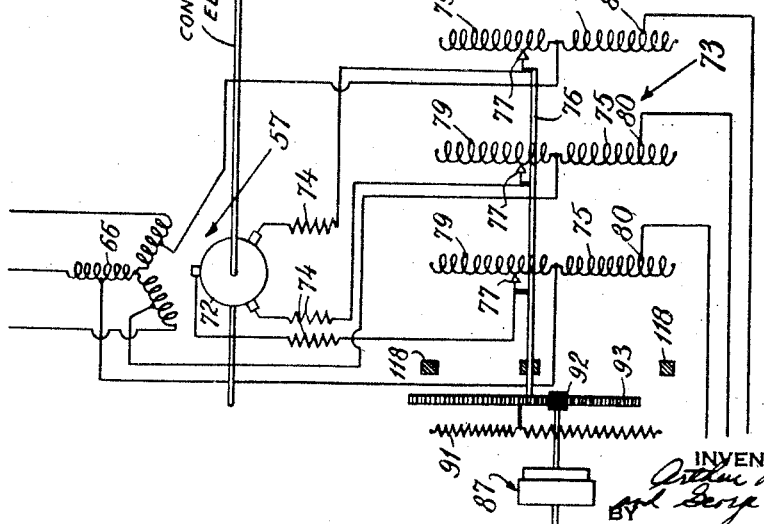

2,420,817

UNITED STATES PATENT OFFICE 2,420,817

REMOTE CONTROL APPARATUS FOR ELECTRIC MOTORS

Arthur P. Davis, Stamford, Conn., and George Agins, Brooklyn, N. Y., assignors to The Arma Corporation, Brooklyn, N. Y., a corporation of New York Application March 18, 1939, Serial No. 262,766

19 Claims. (Cl. 172—239)

This invention relates to control systems and has particular reference to follow-up control systems in which a local or remote controlled element may be instantaneously driven at a rate of speed and through a distance or angle corresponding to the rate and extent of movement of a controlling element.

This application is a continuation-in-part of our earlier application, Serial No. 152,732, filed July 9, 1937, initially copending herewith but now forfeited.

All of the advantages of electronic follow-up control systems are realized in the system of the present invention while eliminating their disadvantages, to the end that a rugged, non-hunting system is provided, which is readily adaptable to various uses where it is desired to accurately and rapidly position one or more light or heavy controlled elements in accordance with the movements of a local or remote controlling element.

The control system of the present invention includes a reversing switching mechanism, one member of which is driven by a relatively low torque pilot motor controlled by the controlling element, and the other member of which is operatively connected to the drive motor whose acceleration should preferably be greater than that of the pilot motor, and which is controlled by the contacts of the reversing switching mechanism. The drive motor tends to de-energize itself by opening the contacts of the reversing switching mechanism. The direction of rotation, speed and acceleration of the drive motor are governed by the intermittent contact action of the reversing switching mechanism and by an automatically adjusted control auto transformer. The drive motor also drives the controlled element, which accordingly instantaneously responds to all movements of the controlling element.

For a more complete understanding of the invention, reference may be had to the accompanying drawings, in which:

Figure 1 is a schematic diagram of the control system of this invention adapted to three-phase alternating current operation, and illustrates the means for changing taps on the control auto transformer in response to speed changes of the drive motor;

Fig. 2 is a schematic diagram of the control system with modifications in the speed responsive means;

Fig. 3 is a schematic diagram of the control system with the reversing switching mechanism electrically connected in the rotor circuit of the drive motor;

Fig. 4 is a schematic diagram of a modified arrangement for electrically connecting the control auto transformer to the power supply;

Fig. 5 is a schematic diagram of the control system with a modified form of device for changing taps on the control auto transformer.

Figure 6:
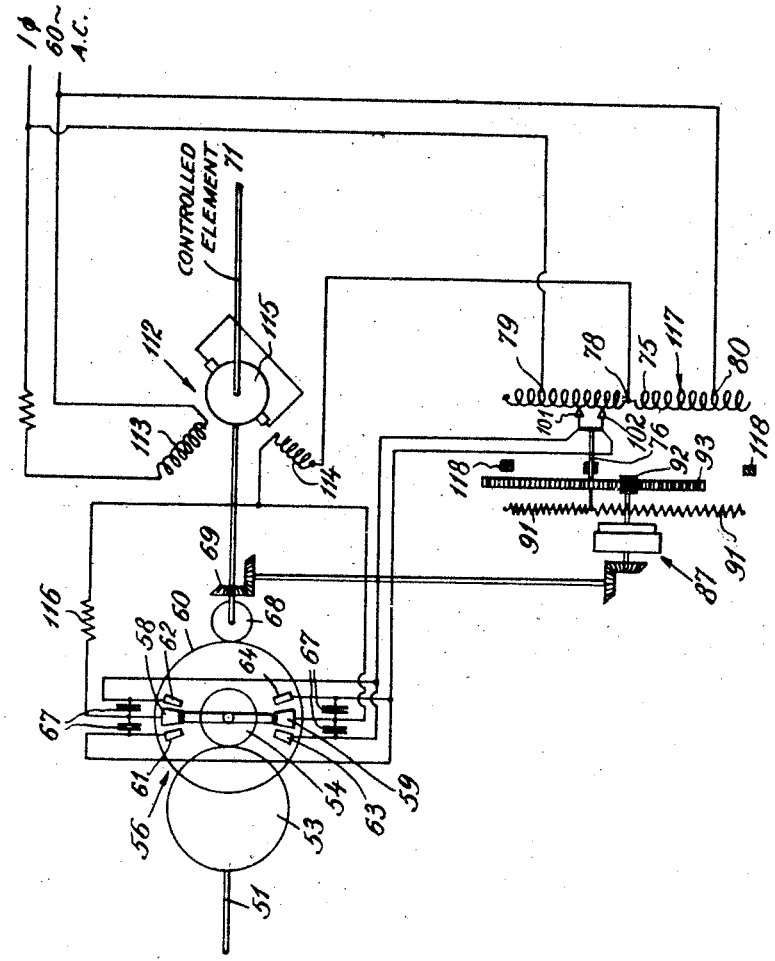
Fig. 6 is a schematic diagram of the control system of this invention as adapted to single phase alternating current operation.

Referring to Fig. 1 of the drawings, the controlling element, located at a local or remote station, may be a driven shaft 10, as shown, or other controlling device, which through gearing 11 and 12, actuates the rotors of respective high and low speed self-synchronous rotary induction transmitters 14 and 15. Located at the local or remote station of the controlled element, which may be a shaft 71 connected to any heavy or light object for driving the same, are respective high and low speed self-synchronous rotary induction receivers 16 and 17, which are electrically connected respectively to the corresponding high and low speed transmitters 14 and 15, so that the rotors of the receivers are in positional agreement with the rotors of the corresponding transmitters at all times. The two receivers 16 and 17 are equipped with follow-up heads 18 and 19, the contacts of which control a suitable pilot motor 40.

The two follow-up heads 18 and 19 include respective gears 20 and 21, which are coaxially journalled to the ends of stationary sleeves 22 and 23, mounted on the frames of the respective receivers 16 and 17. The shaft extensions 24 and 25 of their rotors are free to turn within the corresponding sleeves. The slip rings 26 and 27, and trolley arrangements 28 and 29, are fastened securely to the ends of the corresponding rotor shaft extensions 24 and 25 and are insulated from them. Two long contact segments 30, 31, and 32, 33, and two short contact segments, 34, 35, and 36, 37, are mounted on the respective gears 20 and 21, and insulated from them and from each other. The two long segments are diametrically opposite each other, and the two short segments are diametrically opposite each other and positioned in the spaces between the ends of the corresponding long segments. Contact rollers or brushes 38 and 39 are held at light pressure against the corresponding slip rings 26 and 27 at all times. A double trolley contactor 28 on high speed follow-up head 18, and a single trolley contactor 29 on low speed follow-up head 19, are held at light pressure against the contact segments. The width of the double trolley 28 is such in relation to the length of the short segments 34 and 36 as to make the effective gap on either side of its central position very short.

The long segments of the two follow-up heads are electrically connected to the field systems of the pilot motor 40. The upper long segments 30 and 31 are both connected to one field winding 41, and the lower long segments 32 and 33 are both connected to the other field winding 42. Condensers 43, with protective resistance 44, are electrically connected across the contacts of the follow-up heads for spark suppression. The pilot motor 40 is of the reversible type with its two field windings 41, 42 independent, and the mechanical and electrical connections in the system are such that only one field winding can be energized at a time. When one field winding is energized, the pilot motor 40 will run in one direction, and when the other field winding is energized, it will run in the opposite direction.

The pilot motor shaft 45 carries gears 46 and 47, and mechanical filter 50. The mechanical filter tends to absorb irregularities in the system and may be of any well known type, such as that described in greater detail in copending application Serial No. 115,488, filed December 12, 1936. Gear 46 drives gearing 48 to rotate gear 20 of high speed follow-up head 18, while gear 47 drives gearing 49 to rotate gear 21 of low speed follow-up head 19. The gear ratios and electrical connections between pilot motor 40 and high speed and low speed follow-up heads 18 and 19 are such that when a field winding of the pilot motor 40 is energized by a displacement of trolleys 28 and 29, gear 20 will be driven in the same direction and through the same angle as made by trolley 28, while gear 21 will be driven in the same direction and through the same angle as made by trolley 29. Therefore, when gears 20 and 21 have turned through the same angles as their respective trolleys 28 and 29, the follow-up heads 18 and 19 will be in their neutral positions with the respective field of pilot motor 40 de-energized, so that in effect, when the pilot motor is running it acts to de-energize itself by opening the contacts of the follow-up heads.

The output side of the mechanical filter 50 is secured to shaft 51 which carries gears 52 and 53. Gear 53 drives gear 54 which carries contact arm member 55 of reversing switching mechanism 56. Damping means, not shown, but preferably of the type illustrated and described in said copending application, are interposed between gear 54 and contact arm 55. The reversing switching mechanism controls the power input and the direction of rotation of drive motor 57. Two contacts, 58 and 59, are mounted at the extremities of contact arm 55 and are insulated from the arm and from each other. Gear 60, coaxially mounted with gear 54, is free to turn independently of the latter and carries a disc of insulating material upon which are mounted two contacts 61 and 62, adapted to cooperate with contact 58, and two other contacts, 63 and 64, adapted to cooperate with contact 59.

In the disengaged position of the reversing switching mechanism 56, there is provided a smaller air gap between contacts 58 and 61, 59 and 63, then there is between contacts 58 and 62, 59 and 64, as illustrated in exaggerated form in Fig. 1. The contacts 61 to 64 are spring mounted, preferably as shown in said copending application, so that when contact 58 engages contact 61, for example, and the transmitted force of gear 54 necessitates further turning of the arm 55, the spring of contact 61 will be compressed sufficiently to allow contact 59 to engage contact 64. Similarly, if gear 54 is turned in the opposite direction with the same force, contact 59 will engage contact 63, and then contact 58 will engage contact 62. This is done to directly provide two steps of acceleration for drive motor 57. The first step of acceleration of drive motor 57 is split phase starting effected by condenser 65, which is electrically connected across one phase of motor stator 66, and the second acceleration step is produced by full stator voltage applied to the motor. Condensers 67 are connected across the contacts of the reversing switching mechanism 56 for the purpose of spark suppression. Further details of the construction of the reversing switch mechanism are illustrated and described in said copending application.

Mounted on one end of the rotor shaft of drive motor 57 is a gear 68 which meshes with gear 60 of reversing switching mechanism 56. The ratio between gears 60 and 68, and the electrical connections to drive motor 57, are such that the turning of the rotor tends at all times to turn gear 60 in the same direction and through the same angle as made by gear 54. When gear 60 has turned through the same angle as gear 54, the contacts of the reversing switching mechanism 56 will have returned to the disengaged position, thereby de-energizing drive motor 57, so that in effect, the drive motor in running tends to de-energize itself by opening the contacts of the reversing switching mechanism. The shaft 71 of the drive motor 57 is the controlled element, and may be connected to any light or heavy object for driving the same.

In the usual forms of wound-rotor type induction motors equipped with slip rings and having external resistances connected to the rotor for torque and speed control purposes, the rotor voltage and frequency are functions of the stator voltage and frequency, and the rotor slip. At zero rotor speed, the rotor voltage and frequency are a maximum, with the frequency of the rotor voltage being equal to the frequency of the stator voltage. At synchronous motor speed, the rotor voltage and frequency are zero. Torque is produced by the reaction of the rotor current upon the stator field. Therefore, at low speeds and especially at zero speed, the power which is dissipated in the external rotor resistances is large, and this power drain is of course reflected in the stator power circuit. The drive motor 57 has these known characteristics and consists essentially of a three-phase stator winding 66, and a three-phase wound rotor 72 equipped with a commutator. The drive motor used in conjunction with the automatically adjusted auto transformer 73, provides means for obtaining drive motor speed-torque combinations with relatively low power dissipation.

The electrical connections are such that the voltage produced in the rotor 72 of the drive motor 57 tends at all times to oppose the voltage which is applied to the rotor 72 by the auto transformer 73, and the difference between these two voltages is the effective voltage which causes the rotor current. At the brushes, the frequency of the voltage produced in the commutator equipped rotor 72 is always equal to the frequency of the stator 66 voltage. Resistances 74 are interposed in the circuit between the rotor 72 and the auto transformer 73, and are approximately 25% of the resistance that would be necessary for an equivalent size wound rotor induction motor equipped with slip rings. Therefore, for a required torque, although the same value of current will be supplied to the commutator equipped rotor 72 as would be supplied to the rotor of an equivalent size wound rotor induction motor equipped with slip rings, it will be supplied at a low effective voltage, so that the power dissipated in the resistances 74 will also be low.

The auto transformer 73 consists essentially of three independent windings 75 and a movable contact arm 76 secured to gear 93 so as to rotate therewith, and being equipped with brushes 77 which make contact with the various windings taps. Windings 75, gear 93 and springs 91 which are secured to gear 93, are shown in Fig. 1 in developed form for purposes of clear illustration, but it will be understood that they preferably would be of circular construction. The midpoints 78 of the windings 75 are electrically connected as shown, so that when the Y connection is made, the transformer 73 will be in parallel with the stator winding 66 of drive motor 57, whereby the primary of the auto transformer 73 will be under the control of the contacts of the reversing switching mechanism 56. Two Y-point taps 79 and 80 are provided on windings 75, and the Y-point selection and connection are directly under the control of rotary type mechanical relay 81 which is operated by the output of mechanical differential 82 for engagement with either set of the opposite contacts. Of the two input gears 83 and 84 of the mechanical differential 82, gear 83 is driven by gear 52 of pilot motor shaft 51, and gear 84 is driven by gear 69 on the shaft of drive motor rotor 72.

When the system is in operation, differential input gear 84 tends to drive the output of mechanical differential 82 in the direction opposite to that produced by input gear 83, so that when the controlling element 10 is again at rest with the controlled element 71 in positional agreement with it, the mechanical relay 81 will be in the disengaged position with the contact plate 85, midway between the two opposite sets of contacts. The mechanical relay 81, and the mechanical connections to it, are so proportioned that at the start, the contact plate 85 will engage the proper set of contacts before any of the reversing switching mechanism 56 contacts are engaged.

Gear 69, on the drive motor rotor 72 shaft, also drives the input shaft 86 of the speed responsive device 87, adapted to change taps on the auto transformer 73. The speed responsive device 87 consists essentially of a rotatable magnetic structure 88, a sectional view of which is shown in Fig. 1, comprising a magnetic field system with multipoles which is mounted on shaft 86, so as to rotate therewith, and the poles of which are directed substantially radially. The field coils mounted on the poles, which may be four in number, are energized from a suitable direct current supply. Energization of the field coils produces a radial field across the narrow air gap between the poles faces and the flanged iron frame. Positioned in this air gap is a copper annulus 89, which is secured to shaft 90, so that the annulus rotates in the air gap about an axis aligned with the axis of rotation of magnetic structure 88. As the magnetic structure rotates, eddy currents will be produced in the copper annulus, and these eddy currents react with the field of the magnetic structure and tend to carry the annulus around with the magnetic structure. For constant field strength, the voltage induced and the eddy currents thereby produced in the copper annulus 89 are proportional to the speed of the magnetic structure and therefore the developed torque of the copper annulus 89 is proportional to the speed of the drive motor 57. The copper annulus 89 is connected by shaft 90 to pinion 92 driving rack 93 in suitable guides, not shown. Rack 93 carries contact arm 76 and its movement is restrained by opposed springs 91. Stops 118 limit the movement of contact arm 76. With the linear restraining torque due to the springs 91, the movement of the contact arm 76 is accordingly proportional to the speed of drive motor 57.

In operation of the control system illustrated in Fig. 1, and assuming that it is in its normal deenergized condition with the controlled element 71 in positional agreement with the controlling element 10, rotation of the controlling element 10 will be transmitted through gearing 11 and 12, to the rotors of the high and low speed transmitters 14 and 15. The resultant rotation of the rotors thereof in a corresponding direction and through the corresponding angle will result in an equal and substantially simultaneous movement of the rotors of respective high and low speed receivers 16 and 17. The double trolley 28 of high speed follow-up head 18 will accordingly be displaced to engage either segment 30 or segment 32, depending upon the direction of rotation of the controlling element 10. This will effect energization of the appropriate field coil 41 or 42 of pilot motor 40, and cause the pilot motor to rotate gears 20 and 21 in the appropriate direction, until the follow-up heads 18 and 19 are again in the neutral position.

The rotation of the pilot motor 40 will also be transmitted by its shaft 45 through mechanical filter 50, to gears 52 and 53. The rotation of gear 52 will be transmitted to the input gear 83 of mechanical differential 82, and the output of the mechanical differential will actuate the contact plate 85 of mechanical relay 81, and thereby connect the appropriate taps, either 79 or 80, of the three windings 75 of auto transformer 73, in Y relation. The rotation of gear 53 by pilot motor 40 will be transmitted through gear 54 to actuate contact arm 55 of reversing switching mechanism 56. Depending on the direction of rotation of the controlling element 10, the appropriate contact on contact arm 55 will engage the cooperating contact, either 61 or 63, which will effect split phase operation of drive motor 57 and also auto transformer 73 in the manner described. When the speed responsive device 87 is at rest, the brushes 77 will rest at the midpoint 78 of auto transformer 73, so that split phase operation of the drive motor and auto transformer will cause the drive motor 57 to start.

If split phase operation does not cause the drive motor 57 to accelerate quickly enough to follow rapid movements of the controlling element 10, the pilot motor 40 will impart additional movement to the contact arm 55 of reversing switching mechanism 56, so that the other contact on contact arm 55 will engage cooperating contact 64 or 62, and thereby provide full phase operation to the drive motor 57 and auto transformer 73. Rotation of the drive motor 57 operates the speed responsive device 87, so that the brushes 77 will be driven away from the midpoint 78 of auto transformer windings 75 toward the Y-point which previously was selected and connected by the operation of mechanical relay 81 in response to the direction of movement of the controlling element 10, and through a distance which is proportional to the speed of the drive motor 57, and thereby reduce a proportional amount the voltages that are applied to the rotor 72 of the drive motor by the auto transformer 73.

As the speed of the drive motor 57 increases, the voltage produced in its rotor 72 will decrease a proportional amount. The taps on the auto transformer may be arranged in such relationship to the brushes 77 on contact arm 76, that, for example, the effective voltage in the rotor circuit of drive motor 57 will be a substantially constant value for increasing motor speeds, or, alternatively, the taps may be arranged so that the effective voltage will increase or decrease with increasing motor speeds. The effective voltage in the circuit of the rotor 72 of drive motor 57 can therefore be controlled and regulated in response to the speed of the drive motor, and in accordance with predetermined torque requirements which are met by the selection of the auto transformer, so that the voltage between taps varies in any desired or required manner. The drive motor will quickly accelerate so that the controlled element 71 will be driven into positional agreement with the controlling element 10. As the drive motor slows down in response to slowing of the controlling element 10, the torque produced by the speed responsive device 87 will be reduced an amount proportional to the decrease in drive motor 57 speed, and the restoring force of the restraining springs 91 will tend to move the contact arm 76 of the auto transformer 73 toward the midpoint 78, until a balance is reached between the force of the springs 91 and the torque of the speed responsive device 87.

For any sudden slowing, stopping, or reversing of the controlling element 10, the drive motor will quickly turn the contact gear 60 of the reversing switching mechanism 56 from the position that determines operation of the drive motor 57 in one direction, through the neutral or zero speed position, to the position for operation of the drive motor 57 in the opposite direction. The mechanical relay 81 is substantially instantaneously reversed, so that the Y-point of the auto transformer 73 will be changed from one side of the midpoint 78 to the other side. Inasmuch as the drive motor 57 and the controlled element 71, due to their kinetic energy, are still turning in the original direction when the sudden deceleration of the controlling element takes place, and the phase sequence of the voltage applied to the drive motor stator and the primary of the auto transformer has been reversed by the contacts of the reversing switching mechanism, the reversing of the Y point of the auto transformer, with the position of the contact arm 76 unchanged, will cause the voltage across the secondary of the auto transformer to instantaneously increase, and also causes the voltage which is produced in the drive motor rotor 72 to increase and be equal to the standstill rotor voltage, plus the rotor speed voltage. Therefore, retarding torque will be produced in the drive motor 57, with the kinetic energy of the drive motor and controlled element causing power to be returned to supply.

Also, inasmuch as the device 87 for changing taps on the auto transformer 73 is responsive to the speed and direction of rotation of the drive motor 57, the application of the regenerative braking to the rotor of the drive motor will cause the contact arm of the auto transformer to move toward the new Y-point and thereby decrease the secondary voltage of the auto transformer. The braking of the drive motor rotor 72 also decreases the voltage which is produced in the rotor. The retarding torque of the rotor will continue effective until the rotor slows down to the required speed, in the case of sudden slowing of the controlling element 10, or until the rotor slows to zero speed, in the case of stopping or reversing of the controlling element 10. When zero speed of the drive motor is obtained, the contact brushes 77 will be at the midpoint 78 of the auto transformer windings. From this point on, in the case of reversing of the controlling element, the drive motor will accelerate to the required speed in the reverse direction of rotation, in the same manner as heretofore described. Therefore, the controlled element 71 will substantially instantaneously respond to all movements of the controlling element 10, so that the elements will at all times be in positional agreement with each other.

If, for some reason, the controlled element 71 is unable to follow rapid movements of the controlling element 10, and the elements become displaced more than a permissible amount, trolley 29 of low speed follow-up head 19 will have been advanced to a point where it no longer makes contact with short segment 35 and will thereby disconnect double trolley 28 of high speed follow-up head 18 from the circuit, so that the high speed follow-up head 18 will be deprived of control and control will be assumed by low speed follow-up head 19. When angular correspondence between elements 10 and 71 is again approximated, trolley 29 will again move into engagement with segment 35, so as to restore control to high speed follow-up head 18.

In the control system of this invention, the speed of the drive motor is not limited to the synchronous speed as is the case in the usual type of wound rotor induction motors equipped with slip rings. This synchronous speed will be exceeded when the brushes 77 pass the connected Y-point taps 79 or 80 in a direction away from the midpoint 78 toward the end of the transformer windings 75.

Where a large auto transformer is necessary, and the torque produced by the speed responsive device 87 is not sufficient to change the taps on the auto transformer, a torque amplifier of suitable power, consisting of a follow-up head and motor similar to follow-up head 18 and pilot motor 40, may be added to the control system by interposing the follow-up head between gear 93 and contact arm 76, so that gear 93 will drive the double trolley of the follow-up head, and the contact arm of the auto transformer will be driven by the large gear of the follow-up head.

The arrangement of Fig. 2 illustrates a modification of the speed responsive means for changing taps on the auto transformer 73 of the arrangement of Fig. 1, with the other parts identical and therefore not illustrated. This speed responsive means consists essentially of a relatively small alternating current commutator control motor 94, which has a main field winding 95 and an auxiliary, distributed field winding 96. The auxiliary field winding 96 is connected in quadrature with the main field winding 95, and both the main and auxiliary field windings of the control motor 94 are electrically connected to the auto transformer winding 75, which is directly connected to the power line, the main field winding 95 being connected to midpoint 78 and Y- point location 79, so that in operation the main field strength will remain constant. The auxiliary field winding 96 is connected to midpoint 78 and to mechanical relay contact plate 85, so that in operation the auxiliary field winding 96 will be connected across the selected primary of winding 75, the said selected primary being determined by the operation of mechanical relay 81. The armature is connected across the corresponding series resistor 74, so that, in operation, the voltage which is applied to the armature will be proportional to the current in the drive motor 57 rotor 72 circuit.

In operation of the arrangement of Fig. 2, the contact brushes 77 of the auto transformer 73 will be at the midpoint 78 upon starting, and upon engagement of the contacts of the reversing switching mechanism 56, voltage will be applied to the drive motor stator 66, the auto transformer 73, and the control motor 94. In response to the intermittent contact action of the reversing switching mechanism 56, the drive motor 57 will accelerate, and at the same time the speed responsive means for changing taps on the auto transformer will operate. In this operation, when the effective voltage in the drive motor 57 rotor circuit becomes smaller than a predetermined value, the voltage induced in the armature of the control motor 94 by the auxiliary field winding 96 will be greater than the opposing voltage across the series resistor 74, so that the torque produced by the control motor 94 will be in a direction which tends to drive the contact arm 76 of the auto transformer so that the voltage applied to the drive motor rotor will increase the effective voltage to its former predetermined value.

Conversely, when the effective voltage in the drive motor 57 rotor circuit becomes greater than the predetermined value, the voltage induced in the armature of the control motor 94 by the auxiliary field winding 96 will be smaller than the opposing voltage across the series resistor 74, so that the torque produced by the control motor 94 will be in a direction which tends to drive the contact arm 76 of the auto transformer 73, whereby the voltage applied to the drive motor rotor will decrease the effective voltage to its former predetermined value. When the effective voltage in the drive motor 57 rotor circuit is equal to the predetermined value, the voltage induced in the armature of the control motor 94 by the auxiliary field winding 96 will be equal to the opposing voltage across the series resistor 74, so that the control motor 94 will be at rest along with the contact arm 76 of the auto transformer 73.

As the drive motor 57 accelerates, the voltage produced in its rotor 72 will decrease, thereby decreasing the effective voltage in the rotor circuit, so that the torque produced by the control motor 94 will drive the contact arm 76 of the auto transformer 73 away from the midpoint in a direction determined by the direction of movement of the controlling element 10, and thereby decrease the voltage applied to the drive motor rotor 72. The control motor 94 is therefore responsive to the speed of the drive motor 57, and when the drive motor has accelerated to the required speed, both the voltage produced in the rotor 72 of the drive motor 57 and the voltage applied to the rotor 72 by the auto transformer will be at unchanging values. The effective voltage, which is the difference between these two voltages, will then be the predetermined value which causes the control motor 94 to be at rest along with the contact arm 76 of the auto transformer 73.

If the controlling element 10 is then suddenly reversed in direction, the Y-point of the auto transformer 73 will be substantially instantaneously reversed, and also the phase sequence of the voltage to the drive motor stator 66 and primary of the auto transformer will be reversed. This will reverse the main field of the control motor 94 with respect to both the auxiliary field and armature. Regenerative braking of the drive motor 57 will occur, and the control motor 94, by virtue of the reversed main field 95, will drive the contact arm 76 of the auto transformer toward the midpoint. The contact brushes 77 will be at the midpoint of the auto transformer when the drive motor 57 is at zero speed, and the drive motor 57 will then accelerate in the reverse direction of rotation.

Fig. 3 illustrates a modification of the arrangement of Fig. 1, in which the reversing switching mechanism 97 is electrically connected in the rotor 72 circuit of the drive motor 57. A contact member with three arms designated 98, 99, 100, is provided for the reversing switch 97, with each arm positioned to engage its respective set of two cooperating contacts, in a manner similar to that of reversing switching mechanism 56 of Fig. 1. The contacts on gear 60 of the reversing switching mechanism 97 are so spaced that contact arms 98 and 99 will engage their respective cooperating contacts before contact arm 100 engages its corresponding cooperating contact. This provides two steps of acceleration for the drive motor 57. The windings 75 of auto transformer 73 are permanently connected in Y relation at location 79. The contact arm 76 of the auto transformer is provided with two spaced contact brushes 101, 102, for each winding. These brushes are spaced a predetermined distance apart in a fixed position on the contact arm 76, and are insulated from the contact arm and from each other. The remainder of the system is the same as that of Fig. 1 and is not illustrated in the interest of simplicity.

In operation of the arrangement of Fig. 3, upon starting, the contact arm 76 of the auto transformer 73 will be at the midpoint, so that both contact brushes 101 and 102 will be spaced an equal distance from the midpoint 78, while voltage will be applied by the power service to the stator windings 66 of the drive motor 57 and the primary windings of the auto transformer 73. Upon engagement of the contacts of the reversing switching mechanism 97, the secondary of the auto transformer 73 will apply a voltage to the rotor 72 of the drive motor 57. The drive motor 57 will accelerate, and the speed-responsive device 87, adapted for changing taps on the auto transformer 73, will drive the contact arm 76 away from the midpoint in a direction determined by the direction of movement of the controlling element 10. When the excitation of the stator field 66 and rotor 72 of the drive motor 57 are rotating in the same direction, the contact arm 76 of the auto transformer will be driven toward the Y-point, which will decrease the voltage which is applied to the drive motor rotor 72 by the auto transformer, but when the stator field excitation and rotor of the drive motor 57 are rotating in opposite directions, the contact arm 76 of the auto transformer will be driven away from the Y-point, which will increase the voltage applied to the drive motor rotor 72 by the auto transformer 73. The effective voltage in the drive motor 57 rotor circuit will therefore be controlled and regulated in response to the speed of the drive motor 57, and when the required speed is reached, the contact arm 76 of the auto transformer will be at rest with the contact brushes on the correct setting.

If the motion of the controlling element 10 is suddenly reversed in direction, the contact member 98, 99, 100 of the reversing switching mechanism 97 will engage the opposite cooperating contacts, so that the control will be switched to the brushes on the contact arm 76 that are closest to the midpoint of the auto transformer 73. This will instantaneously increase the voltage which is applied to the drive motor rotor 72 by the auto transformer 73 when the contact arm 76 is between the midpoint and the Y-point, or will instantaneously decrease the voltage which is applied to the drive motor by the auto transformer when the contact arm 76 is at the other side of the midpoint, and with the kinetic energy of the drive motor 57 and controlled element 10, will cause regeneration braking of the drive motor 57. Braking of the drive motor will decrease the torque of the speed responsive device 87 for changing taps on the auto transformer 73 and thus allow the force of the restraining springs 91 to drive the contact arm 76 of the auto transformer toward the midpoint to increase or decrease the voltage applied to the drive motor rotor 72 by the auto transformer 73 a proportional amount, so that zero speed will be quickly reached. When zero speed of the drive motor 57 is reached, the contact arm 76 of the auto transformer will again be in the starting position, i. e., the midpoint of the auto transformer will be equidistant between the contact brushes 101, 102. The drive motor 57 will then quickly accelerate in the opposite direction until the controlled element 71 is again in positional agreement with the controlling element. In this modification, the contacts of the reversing switching mechanism 97 are required to handle the drive motor rotor current, which is much higher than the stator current handled by the contacts in the arrangement of Fig. 1, for example.

Fig. 4 illustrates a modification of the arrangement of Fig. 1 in respect to connections of the auto transformer to power, the remainder of the arrangement of Fig. 1 remaining the same. In the modification of Fig. 4, instead of being supplied directly from the power service which supplies the drive motor stator, the auto transformer 73 is supplied from a portion of the drive motor stator windings 66, so that the latter act as an auto transformer. Tapped connections in the stator-transformer 66, corresponding to the desired voltage, supply the control auto transformer 73. The rotor 72 of the drive motor 57 is wound accordingly, and this method is preferred in cases where excessively high voltages would be induced in the secondary of the control auto transformer 73 if it were connected directly to the power service.

Fig. 5 illustrates a modification of the auto transformer 73 control of the arrangement illustrated in Fig. 1, in which the stator windings of a relatively small torque motor 103 are connected in delta relation to each other and in parallel with the stator windings 66 of the drive motor 57. Working in conjunction with torque motor 103 is a preloaded spring device 104, which consists essentially of two spiral springs 105 and 106 with the inner end of each spring fixed to stationary rod 107 and their outer ends engage fixed stops 108. A crank bail 109 secured on the motor shaft carries fingers 110 and 111, and the other end of the motor shaft carries pinion 92 meshing with rack 93. Spring 106 is wound in the opposite direction to spring 105 and both springs are preloaded an equal amount, and are prevented from unwinding by means of the fixed stops 108. In one direction of rotation of bail 109, spring 105 only will be additionally wound by corresponding finger 110, and in the opposite direction of rotation of bail 109, spring 106 only will be additionally wound by finger 111. Due to the preloading, the initial tension of the springs 105 and 106 is large compared to the additional tension required for operation, so that the restoring force of the springs 105 and 106 acting on the bail 109 will be approximately constant for all positions of the auto transformer contact arm 76, except for the zero speed position where the springs 105 and 106 engage stops 108 and this restoring force will be zero.

This arrangement of Fig. 5 for changing taps on the auto transformer 73 tends to adjust itself, so that when the drive motor 57 is running, the ratio of the engaged time to the disengaged time of the reversing switching mechanism 56 contact action will be constant for all constant speed and torque conditions, independent of the speed or torque of the drive motor 57.

Thus, upon starting, the contact arm 76 of the auto transformer 73 will be at the midpoint, and upon engagement of the contacts of the reversing switching mechanism 56, voltage will be applied to the drive motor 57 stator 66, the torque motor 103 stator, and the auto transformer 73. In response to the intermittent contact action of the reversing switching mechanism 56, the drive motor 57 tends to accelerate to the required speed determined by the movement of the controlling element 10.

Inasmuch as the stator windings of both the drive motor 57 and torque motor 103 are energized simultaneously by the contacts of the reversing switching mechanism 56, any torque or speed requirements imposed on the drive motor 57 will also be reflected in the operation of the torque motor 103. For example, if during the operation of the system, additional speed or torque is required from the drive motor 57, the ratio of the engaged time to the disengaged time of the reversing switching mechanism 56 contact action will increase. This action will increase the average value of the voltage that is applied to the stators of the drive motor 57 and the torque motor 103, which will increase the torque of the torque motor 103 and cause it to drive the contact arm 76 of the auto transformer 73 away from the midpoint in a direction determined by the direction of movement of the controlling element 10. Movement of the contact arm 76 of the auto transformer away from the midpoint will decrease the voltage that is applied to the drive motor 57 rotor by the auto transformer 73, and therefore the effective voltage and the current in the drive motor rotor 72 circuit will increase, and a corresponding increase in torque and speed will be obtained.

When the required speed or torque is reached by the drive motor 57, the ratio of the engaged time to the disengaged time of the reversing switching mechanism 56 contact action will decrease to the constant value for conditions of unchanging speed and torque. This will decrease the torque produced by the torque motor 103 to a value equal in force but opposite in sense to the restoring force of the spring device 104, so that the resultant force acting upon the contact arm 76 of the auto transformer 73 will be zero, and therefore the contact arm 76 will remain at this setting until the torque motor is affected by changes in the contact action of the reversing switching mechanism 56. For any sudden slowing, stopping, or reversing of the controlling element 10, regenerative braking of the drive motor 57 will occur, and when the controlling element 10 is again at rest with the controlled element 71 in positional agreement with it, the contact arm 76 of the auto transformer 73 will be at the midpoint.

Fig. 6 illustrates schematically the control system of this invention as adapted to the use of a single phase drive motor, the remainder of the system being the same as illustrated in Fig. 1. The drive motor 112 in this case is preferably of the single phase commutator alternating current type, having a main field winding 113, an auxiliary field winding 114, and armature 115. A resistor 116 is interposed in the circuit between the auxiliary field winding 114 and one of the contacts on the arm of the reversing switching mechanism 56, so that two steps of acceleration for the drive motor 112 are obtained. The auto transformer 117 is of single phase type, and the contact arm 76 is equipped with two spaced contact brushes 101 and 102, so spaced and insulated from each other that a predetermined voltage will exist between the brushes when the transformer 117 is energized.

Upon starting, the contact arm of the auto transformer 117 will be at the midpoint, so that both contact brushes will be spaced an equal distance from the midpoint, and voltage will be applied directly to the main field winding 113 of the drive motor 112, and to the primary of the auto transformer 117. Upon engagement of the contacts of the reversing switching mechanism 56, the initially displaced position of the brushes on the contact arm 76 with respect to the midpoint of the auto transformer, will cause the secondary of the auto transformer 117 to apply a voltage to the auxiliary field winding 114 of the drive motor. The contacts of the reversing switching mechanism 56 first engaged, contact 58 with either contact 61 or 62, will apply reduced voltage to the auxiliary field winding 114 due to the resistor 116 interposed in the circuit. The contacts of the reversing switching mechanism 56 next engaged will short circuit the resistor 116 and apply the auto transformer secondary voltage, as determined by the position of the contact arm, to the drive motor auxiliary field winding 114.

The drive motor 112 will accelerate, and the speed responsive device 7 for changing taps on the auto transformer 117 drives the contact arm 76 away from the midpoint in a direction determined by the direction of movement of the controlling element 10, and thus increases the voltage applied to the auxiliary field winding 114 of the drive motor 112. Inasmuch as the device 7 for changing taps on the auto transformer 117 is responsive to the speed of the drive motor 112, when the required speed is reached the contact arm 76 will be stationary with the contact brushes on the correct setting.

If the controlling element 10 is then suddenly reversed, the contact arm member of the reversing switching mechanism 56 will engage the opposite contacts, so that the control will be substantially instantaneously switched to the other brush on the contact arm 76 of the auto transformer 117. This reduces the voltage that is applied to the auxiliary field winding 114 of the drive motor 112, and with the kinetic energy of the drive motor 112 and controlling element 10, will cause regenerative braking of the drive motor 112. Braking of the drive motor 112 will reduce the torque of the speed responsive device 87 for changing taps on the auto transformer 117, and thus allow the restraining springs 91 to drive the contact arm 76 of the auto transformer toward the midpoint, thereby reducing the voltage applied to the auxiliary field winding 114 by a proportional amount so, that zero speed will be quickly reached. When zero speed is reached, the contact arm 76 of the auto transformer will again be in the starting position with the midpoint of the auto transformer equidistant between the two contact brushes. The drive motor 112 then accelerates in the opposite direction until the controlled element 71 is again in positional agreement with the controlling element 10.

Although certain preferred embodiments of the invention have been illustrated and described herein, the invention is not to be limited thereby, but is susceptible of various changes in form and detail within the scope of the appended claims.

We claim:

1. In a system for controlling a controlled element with a controlling element, the combination of a driving motor for said controlled element, a reversing switch for controlling said motor and jointly operated thereby and by said controlling element, and an auto transformer in the supply circuit of said motor responsive to the movement of said motor for controlling the voltage of the supply thereto.

2. In a system for controlling a controlled element with a controlling element, the combination of a reversible driving motor for said controlled element, a reversing switch controlling said motor and having two sets of cooperating movable contacts, driving connections between one set of contacts and said motor, operative connections between said controlling element and said other set of contacts, and an auto transformer responsive to movement of one of said elements for controlling said motor independently of said switch.

3. In a system for controlling a controlled element with a controlling element, the combination of a reversible driving motor for said controlled element, a reversing switch controlling said motor and having two sets of cooperating movable contacts, driving connections between one set of contacts and said motor, operative connections between said controlling element and said other set of contacts, and electrical means responsive to the speed of one of said elements for controlling said motor independently of said switch.

4. In a system for controlling a controlled element with a controlling element, the combination of a reversible driving motor for said controlled element, a reversing switch controlling said motor and having two sets of cooperating movable contacts, driving connections between one set of contacts and said motor, operative connections between said controlling element and said other set of contacts, a transformer for said motor, and means responsive to movement of one of said elements for changing supply connections to said transformer.

5. In a system for controlling a controlled element with a controlling element, the combination of a reversible driving motor for said controlled element, a reversing switch controlling said motor and having two sets of cooperating movable contacts, driving connections between one set of contacts and said motor, operative connections between said controlling element and said other set of contacts, and an auto transformer in the circuit of said motor controlled by one of said elements.

6. In a system for controlling a controlled element with a controlling element, the combination of a reversible driving motor for said controlled element, a reversing switch controlling said motor and having two sets of cooperating movable contacts, driving connections between one set of contacts and said motor, operative connections between said controlling element and said other set of contacts, and an auto transformer in the circuit of said motor responsive to the movement of said motor.

7. In a system for controlling a controlled element with a controlling element, the combination of a reversible driving motor for said controlled element, a reversing switch controlling said motor and having two sets of cooperating movable contacts, driving connections between one set of contacts and said motor, operative connections between said controlling element and said other set of contacts, an auto transformer in the circuit of said motor, and means responsive to the speed of one of said elements for controlling said transformer.

8. In a system for controlling a controlled element with a controlling element, the combination of a reversible driving motor for said controlled element, a reversing switch controlling said motor and having two sets of cooperating movable contacts, driving connections between one set of contacts and said motor, operative connections between said controlling element and said other set of contacts, an auto transformer in the circuit of said motor, and means responsive to the speed of said driven element for controlling said transformer.

9. In a system for controlling a controlled element with a controlling element, the combination of a reversible driving motor for said controlled element, a reversing switch controlling said motor and having two sets of cooperating movable contacts, driving connections between one set of contacts and said motor, operative connections between said controlling element and said other set of contacts, an auto transformer for said motor, means responsive to movement of one of said elements for controlling said transformer, and means responsive to movement of one of said elements for changing supply connections to said transformer.

10. In a system for controlling a controlled element with a controlling element, the combination of a reversible driving motor for said controlled element, a reversing switch controlling said motor and having two sets of cooperating movable contacts, driving connections between one set of contacts and said motor, operative connections between said controlling element and said other set of contacts, an auto transformer for said motor, a movable contactor therefor, and means responsive to movement of one of said elements for controlling said contactor.

11. In a system for controlling a controlled element with a controlling element, the combination of a reversible driving motor for said controlled element, a reversing switch controlling said motor and having two sets of cooperating movable contacts, driving connections between one set of contacts and said motor, operative connections between said controlling element and said other set of contacts, an auto transformer for said motor controlled by movement of one of said elements, and means responsive to stopping of said one element for restoring said transformer to neutral position.

12. In a system for controlling a controlled element with a controlling element, the combination of a reversible driving motor for said controlled element, a reversing switch controlling the field excitation of said motor and having two sets of cooperating movable contacts, driving connections between one set of contacts and the rotor of said motor, operative connections between said controlling element and said other set of contacts, and an auto transformer actuated by the rotor of said motor for controlling said rotor.

13. In a system for controlling a controlled element with a controlling element, the combination of a reversible driving motor for said controlled element, a reversing switch controlling said motor and having two sets of cooperating movable contacts, driving connections between one set of contacts and said motor, operative connections between said controlling element and said other set of contacts, an auto transformer for said motor, a contactor therefor, means responsive to the speed of said motor for actuating said contactor, and means responsive to a reversal in the direction of rotation of said motor for changing the supply connections to said transformer.

14. In a system for controlling a controlled element with a controlling element, the combination of a reversible driving motor for said controlled element, a reversing switch controlling said motor and having two sets of cooperating movable contacts, driving connections between one set of contacts and said motor, operative connections between said controlling element and said other set of contacts, an auto transformer for said motor, an auxiliary motor energized in accordance with the energization of said first motor, and operative connections between said auxiliary motor and said auto transformer.

15. In a system for controlling a controlled element with a controlling element, the combination of a reversible driving motor for said controlled element, a reversing switch having two sets of cooperating movable contacts, driving connections between one set of contacts and said motor, operative connections between said controlling element and said other set of contacts, electrical connections between one set of contacts and said motor, electrical connections between the other set of said contacts and supply, an auto transformer in said first-named electrical connections, and operative connections between said motor and said auto transformer.

16. In a system for controlling a controlled element with a controlling element, the combination of a reversible driving motor for said controlled element, a reversing switch having two sets of cooperating movable contacts, driving connections between one set of contacts and said motor, operative connections between said controlling element and said other set of contacts, electrical connections between one set of contacts and said motor, electrical connections between the other set of said contacts and supply, an auto transformer in said last-named electrical connections, means responsive to the speed of rotation of said motor, and operative connections between said means and said auto transformer.

17. In a system for controlling a controlled element with a controlling element, the combination of a driving motor for said controlled element, a transformer wound stator for said motor connected to supply, an auto transformer supplied from said stator, variable connections between said auto transformer and the rotor of said motor, and means responsive to the speed of the rotor of said motor for adjusting said variable connections.

18. In a system for controlling a controlled element with a controlling element, the combination of a reversible driving motor for said controlled element, a reversing switch controlling the field excitation of said motor and having two sets of cooperating movable contacts, driving connections between one set of contacts and the rotor of said motor, operative connections between said controlling element and said other set of contacts, an auto transformer, connections between said transformer and rotor circuit whereby the transformer voltage opposes the rotor voltage, and operative connections between the rotor and said transformer, whereby the rotor circuit is adjusted in accordance with the mechanical output of said motor.

19. In a system for controlling a controlled element with a controlling element, the combination of a driving motor for said controlled element, a reversing switch for controlling said motor and jointly operated thereby and by said controlling element, an auto transformer in the rotor circuit of said motor, an auxiliary motor in the stator circuit of said driving motor, operative connections between said auxiliary motor and said auto transformer, and means responsive to the direction of rotation of said auxiliary motor for restoring said transformer to neutral position upon stopping of the movement of said controlled element.

ARTHUR P. DAVIS.
GEORGE AGINS.

REFERENCES CITED

The following references are of record in the file of this patent:

UNITED STATES PATENTS

| Number | Name | Date |
|---|---|---|
| 1,950,427 | Willink | Mar. 13, 1934 |
| 935,327 | Routin | Sept. 28, 1909 |

FOREIGN PATENTS

| Number | Country | Date |
|---|---|---|
| 683,021 | France | Feb. 22, 1929 |

Certificate of Correction

Patent No. 2,420,817.                                                                                   May 20, 1947.

ARTHUR P. DAVIS ET AL.

It is hereby certified that the name of the assignee in the above numbered patent was erroneously described and specified as "The Arma Corporation" whereas said name should have been described and specified as *Arma Corporation*, as shown by the record of assignments in this Office; and that the said Letters Patent should be read with this correction therein that the same may conform to the record of the case in the Patent Office.

Signed and sealed this 26th day of August, A. D. 1947.

[SEAL]

LESLIE FRAZER,
*First Assistant Commissioner of Patents.*